(12) United States Patent
Cappellotto

(10) Patent No.: US 9,844,976 B2
(45) Date of Patent: Dec. 19, 2017

(54) METHOD FOR THE MANUFACTURE OF SELF-LOCKING NIPPLES

(75) Inventor: Guido Cappellotto, Arcore (IT)

(73) Assignee: ALPINA RAGGI S.P.A., Lomagna (IT)

( * ) Notice: Subject to any disclaimer, the term of this patent is extended or adjusted under 35 U.S.C. 154(b) by 653 days.

(21) Appl. No.: 14/000,905

(22) PCT Filed: Jan. 25, 2012

(86) PCT No.: PCT/EP2012/051137
§ 371 (c)(1),
(2), (4) Date: Aug. 22, 2013

(87) PCT Pub. No.: WO2012/113599
PCT Pub. Date: Aug. 30, 2012

(65) Prior Publication Data
US 2013/0328382 A1   Dec. 12, 2013

(30) Foreign Application Priority Data
Feb. 22, 2011 (IT) .............................. PD2011A0050

(51) Int. Cl.
*B60B 21/06* (2006.01)
*B60B 1/04* (2006.01)
*B60B 1/02* (2006.01)

(52) U.S. Cl.
CPC .............. *B60B 1/044* (2013.01); *B60B 1/041* (2013.01); *B60B 21/062* (2013.01); *Y10T 29/49506* (2015.01)

(58) Field of Classification Search
CPC ........ B60B 1/044; B60B 1/047; B60B 21/062
USPC ...................................................... 301/58, 61
See application file for complete search history.

(56) References Cited

U.S. PATENT DOCUMENTS

| | | | | |
|---|---|---|---|---|
| 1,734,184 | A * | 11/1929 | Stoler | B60B 1/00 301/58 |
| 2,778,690 | A | 1/1957 | Horling | |
| 6,205,664 | B1 * | 3/2001 | Cappellotto | B60B 1/045 29/894.33 |
| 6,557,946 | B1 * | 5/2003 | Gerrit | B60B 1/00 29/894.33 |
| 7,137,671 | B2 * | 11/2006 | Passarotto | B60B 1/041 29/894.333 |

(Continued)

FOREIGN PATENT DOCUMENTS

| | | |
|---|---|---|
| EP | 0838352 A2 | 4/1998 |
| EP | 1559582 A1 | 8/2005 |
| WO | 2004065138 A1 | 8/2004 |

OTHER PUBLICATIONS

ISR and Written Opinion in application PCT/EP2012/051137.

*Primary Examiner* — J. Allen Shriver, II
*Assistant Examiner* — Travis Coolman
(74) *Attorney, Agent, or Firm* — Kristina Castellano; Castellano PLLC

(57) ABSTRACT

A method for manufacturing self-locking nipples comprising the steps of providing a semi-finished nipple (10) with an enlarged head (5) in comparison with the shank (6), providing at least a first blind hole (11, 11a) in that head, injecting a fluid resin into the hole (11, 11a) and solidifying so as to obtain a corresponding insert (9, 9a), making a second axial hole (7) in the semi-finished product at least partly intersecting the said insert (9, 9a).

6 Claims, 6 Drawing Sheets

(56) References Cited

U.S. PATENT DOCUMENTS

| | | | | |
|---|---|---|---|---|
| 7,374,251 B2* | 5/2008 | Okajima | ................ | B60B 1/041 301/104 |
| 2001/0054840 A1* | 12/2001 | Schlanger | ............... | B60B 1/003 301/59 |
| 2004/0155518 A1* | 8/2004 | Schlanger | ............ | B60B 1/0261 301/58 |
| 2008/0054710 A1* | 3/2008 | Spahr | ...................... | B60B 1/041 301/58 |
| 2008/0265656 A1* | 10/2008 | Heyse | .................. | B29C 70/342 301/55 |
| 2010/0084909 A1* | 4/2010 | Mason | ................... | B60B 1/041 301/58 |
| 2010/0301662 A1* | 12/2010 | Schlanger | ............... | B60B 1/003 301/58 |
| 2011/0291466 A1* | 12/2011 | Kanehisa | ............... | B60B 1/003 301/59 |
| 2012/0299365 A1* | 11/2012 | Cappellotto | ........... | B60B 1/045 301/58 |

\* cited by examiner

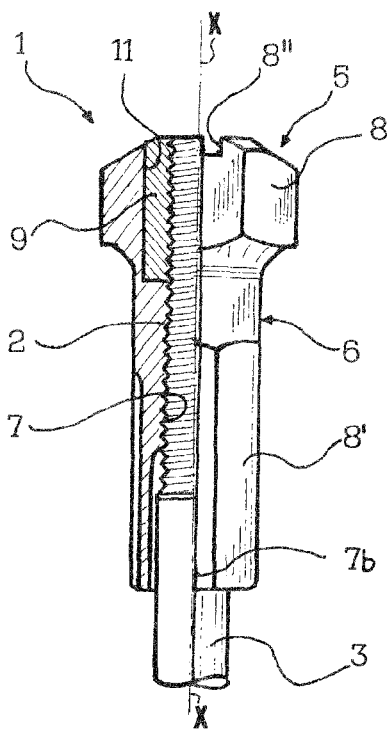
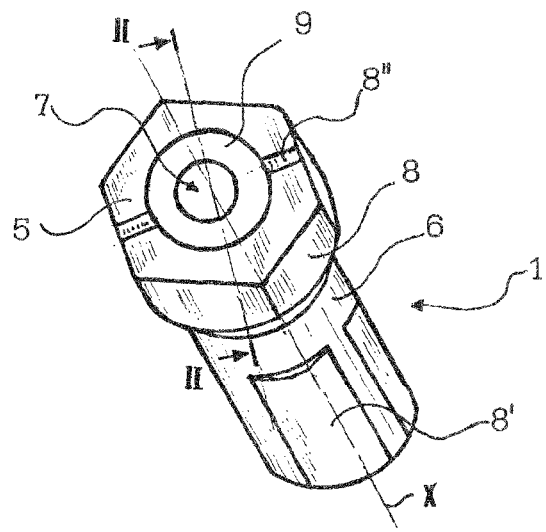
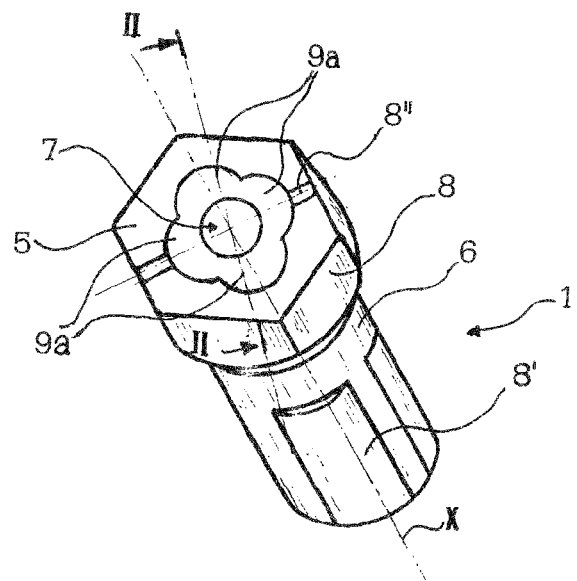
FIG.1
FIG.2
FIG.3

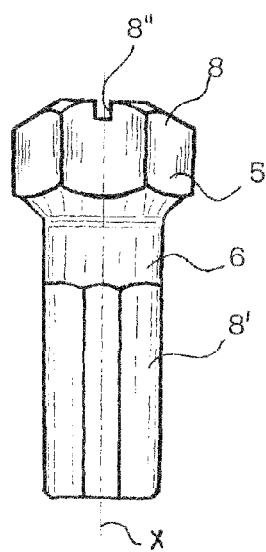
FIG.3A
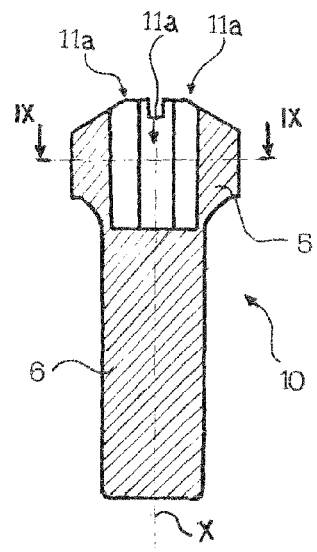
FIG.3B
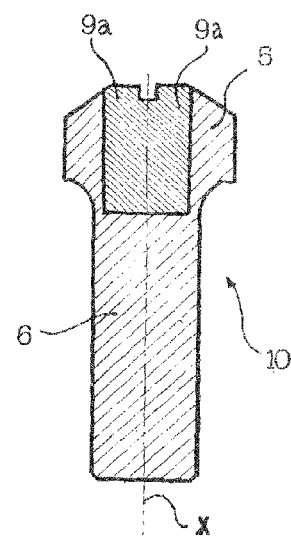
FIG.3C
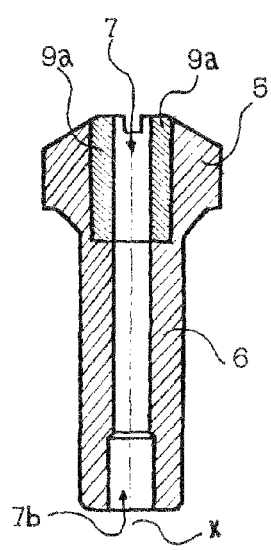
FIG.3D
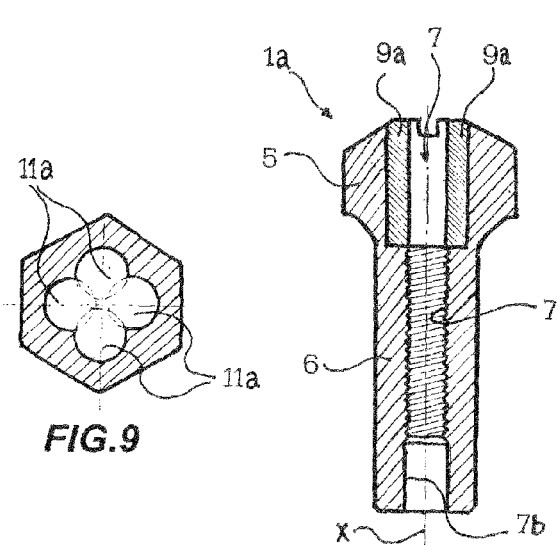
FIG.9
FIG.3E

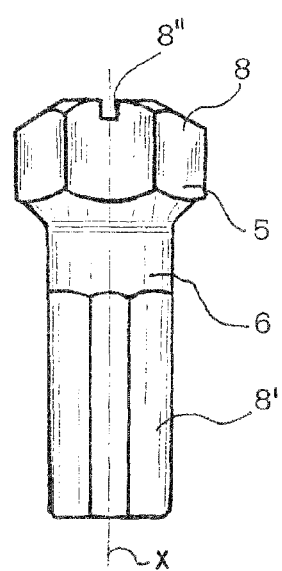
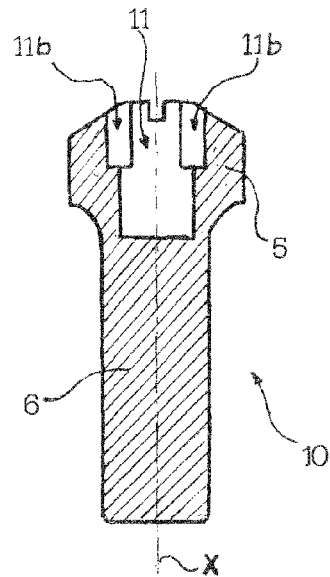
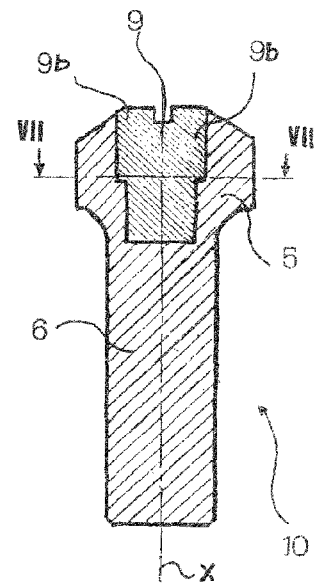
*FIG.5A*  *FIG.5B*  *FIG.5C*
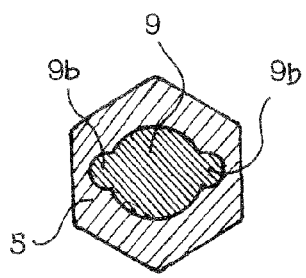
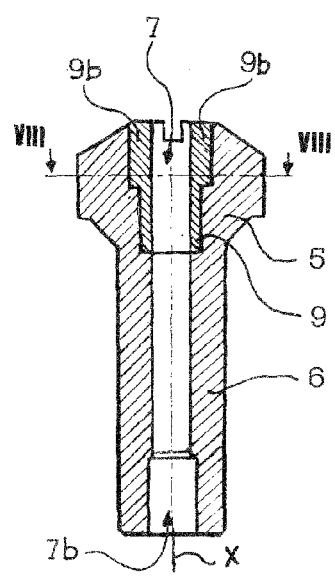
*FIG.7*
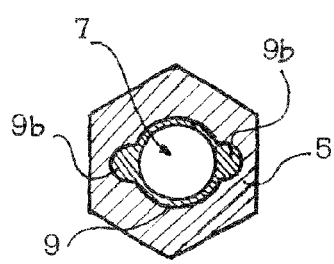
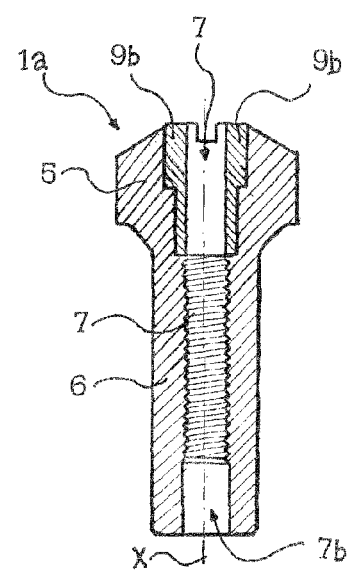
*FIG.8*  *FIG.5D*  *FIG.5E*

METHOD FOR THE MANUFACTURE OF SELF-LOCKING NIPPLES

CLAIM FOR PRIORITY

This application is a U.S. National Stage Application of PCT/EP2012/051137 filed on Jan. 25, 2012, which claims priority to Italian patent application PD2011A000050 filed on Feb. 22, 2011, the contents of both of which are incorporated herein by reference.

The invention relates to a method for the manufacture of self-locking nipples and a nipple manufactured according to that method.

It is known from U.S. Pat. No. 2,778,690 that it is possible to manufacture nipples for spoked wheels provided with a threaded hole which receives the threaded end of a spoke and also provided with an insert affecting a length of the threaded hole acting to prevent the nipple from accidentally working loose from the spoke as a result of vibration occurring during use of the wheel.

In this case the insert is made of fibrous material and is inserted into an axial hole in the nipple, coaxially with the threaded hole. This embodiment is suitable for the production of inserts extending within the shank of the nipple, and is suitable for screwing in spokes of various lengths, but nevertheless requires nipples and inserts of relatively large diameter because it is very difficult if not impossible to insert relatively small inserts into holes of small diameter such as those made in small nipples.

This disadvantage has partly been overcome by the method described in U.S. Pat. No. 6,205,664 by the same applicant. This patent suggests the use of substantially spherical inserts which are applied to the nipple by beveling the head. However in this way only nipples of limited length which are not suitable for use with relatively short spokes can be manufactured, because the thread at the end of the spokes may not engage a self-locking insert sufficiently or at all.

The problem underlying this invention is that of providing a method for manufacturing self-locking nipples which are structurally and functionally designed to overcome all the disadvantages mentioned with reference to the cited known art.

This problem has been resolved by the invention through a method for the manufacture of self-locking nipples and a nipple manufactured according to that method in accordance with the specifications in the following claims.

Characteristics and advantages of the invention will be more apparent from the following detailed description of a method and corresponding nipple according to the invention illustrated by way of indication without limitation with reference to the appended drawings in which:

FIG. 1 is a lateral view in partial cross-section of a nipple according to the invention fitted to a spoke of a wheel;

FIG. 2 is a perspective view of the nipple in FIG. 1 according to a first embodiment;

FIG. 3 is a perspective view of the nipple according to this invention according to a second embodiment;

FIGS. 3A to 3E are diagrammatical lateral views in cross-section of the stages of manufacture according to the variant embodiment of the nipple in FIG. 3;

FIGS. 4A to 4E and 5A to 5E are diagrammatical lateral views in cross-section of stages in manufacture of the nipples in FIG. 4 and FIG. 5, respectively;

FIGS. 6, 7 and 8 are views in transverse cross-section respectively of the semi-finished product which forms the nipple according to this invention during the stages of processing in FIGS. 4C, 5C and 5D, respectively; and FIG. 9 is a view in transverse cross-section of the semi-finished product forming the nipple according to this invention during the processing stage in FIG. 3B.

Figure 2A:
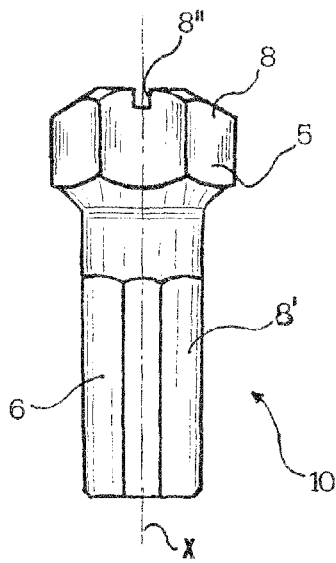
FIGS. 2A to 2E are diagrammatical lateral views in cross-section of the stages of manufacturing the nipple in FIG. 2.
Figure 2B:
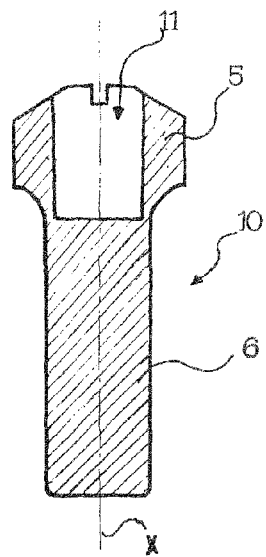
Figure 2C:
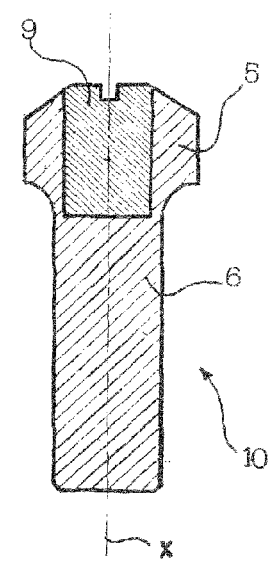
Figure 2D:
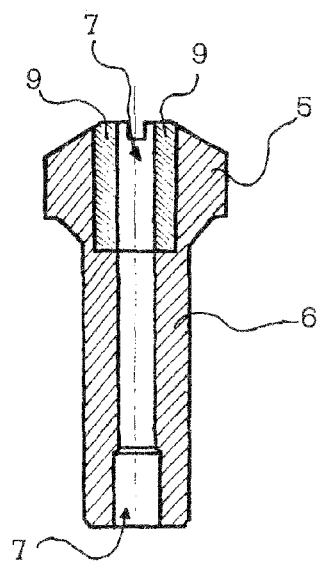
Figure 2E:
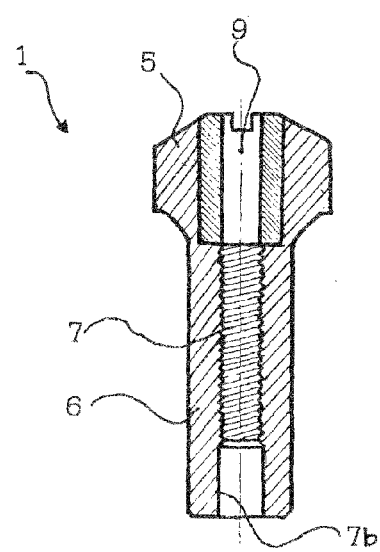

In the FIG. 1 indicates as a whole a nipple which is intended to connected a threaded extremity 2 of a spoke 3 to a rim, not shown, of a spoked wheel. In nipple 1 there is an enlarged head 5 which is coaxial with respect to a shank 6 of axis X.

Head 5 and shank 6 have an axial threaded hole 7 and one or other or both have externally an adjustment member such as a polygonal portion 8, 8' and/or a slot for screwdrivers 8" used to rotate nipple 1 with respect to the spoke when the wheel is assembled and/or tensioned.

An insert 9 formed from a resin injected in the fluid state is provided over a length 11 of axial hole 7 extending from head 5.

In a variant of this invention, in order to produce nipples according to the teaching of patent application No. PD2010A000004 by the same applicant, the contents of which are to be considered to be incorporated herein for the purposes of description, nipple 1A is manufactured with two or more inserts 9a of plastics material arranged in a ring about the X axis of the nipple and at a distance therefrom which is less than a diameter of second hole 7, as illustrated in FIG. 3, and of a diameter such that the lateral surface of hole 7 is wholly in contact with the plastics material of inserts 9a.

The stages in the method of manufacturing nipple 1, 1A are illustrated in FIGS. 2A to 2F and 3A to 3F respectively. Nipple 1, 1A is obtained from a round metal bar which is shaped by pressing to obtain a semi-finished product 10 in which the shank 6 and head 5 may be seen. This semi-finished product may be provided with adjustment members 8, 8', 8".

One or more first blind holes 11, 11a, corresponding in position, depth, diameter and relative orientation to inserts 9, 9a which it is intended to provide, and which consequently define lengths 11 extending from head 5 in which they are located, are initially made in the semi-finished product.

In the first embodiment of nipple 1 a first hole 11 having axis X of a diameter greater than that of hole 7 is initially made, while several holes are made in the other embodiment of nipple 1A. In this latter embodiment, in positions such that part of the cross-section of blind holes 11a subsequently intersects hole 7 when this is subsequently made in the nipple.

Semi-finished product 10 so obtained is then taken up again, injecting a plastics material (nylon or other thermoplastic resin) into holes 11 in the fused state. After subsequent cooling semi-finished product 10 will therefore have holes 11 filled with inserts 9, 9a, of resin of generally cylindrical shape.

Subsequently hole 7, which may be provided with an entry portion 7b of larger diameter intended to receive the free end of spoke 3, is then made in the semi-finished product.

Once hole 7 has been made, this is threaded over the length of metal necessary to perform the conventional function of the nipple, that is from entry portion 7b, if present, to inserts 9 and 9a, without involving the surfaces of the latter.

In this way it is possible to make nipples with inserts of small diameter provided directly in the place of their corresponding seats, overcoming the difficulty of the separate insertion of the latter into corresponding receiving seats. It is thus possible to manufacture nipples with relatively long inserts in relation to their diameter, or multiple inserts according to the teachings of patent application PD2010A000004 by the same applicant.

When the nipple is threaded to the end of a spoke, as the latter engages the length of hole 7 in contact with insert 9, 9a there is a friction coupling between the thread on the spoke and that in the insert producing the desired self-locking effect between the spoke and nipple.

Figure 4:
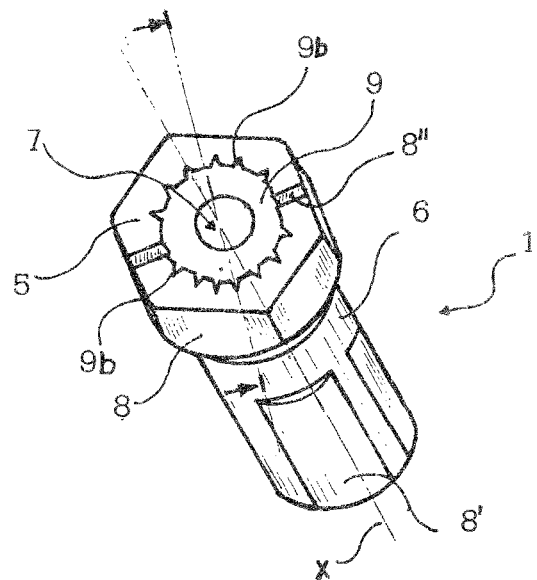
FIGS. 4 and 5 are perspective views of further variants of construction of the nipple in FIG. 2 and FIG. 3.
Figure 5:
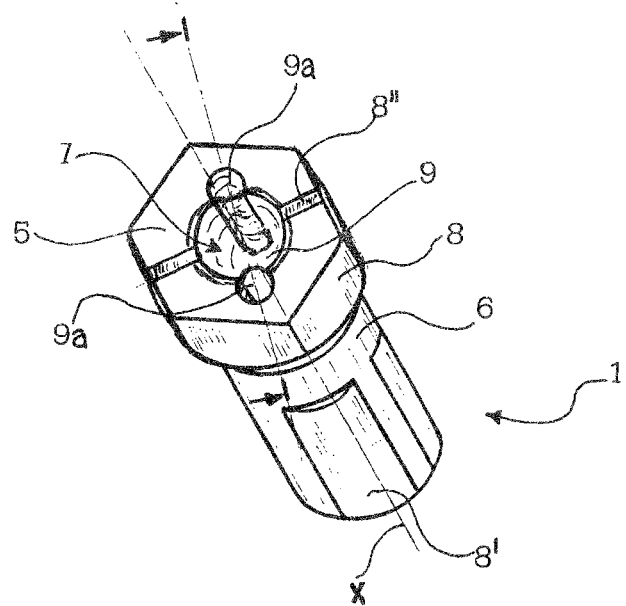

FIGS. 4 and 5 illustrate two further embodiments of the nipple according to this invention.

In particular the nipple in FIG. 4 differs from the embodiment in FIG. 2 through the presence in insert 9 of at least one stop member 9b which engages corresponding seats made in hole 11. These stop members 9b extend along an axis X along the length of insert 9. In this way members 9b can prevent rotation of insert 9 with respect to the X axis, in particular during the machining of through hole 7.

Figure 4A:
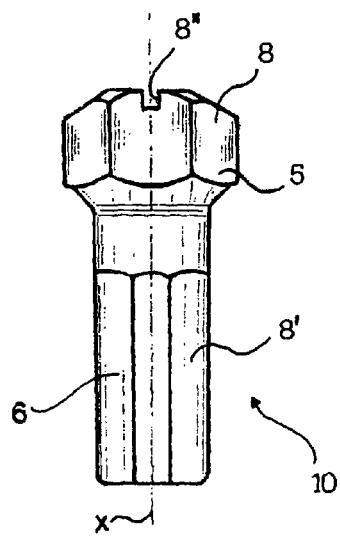
Figure 4B:
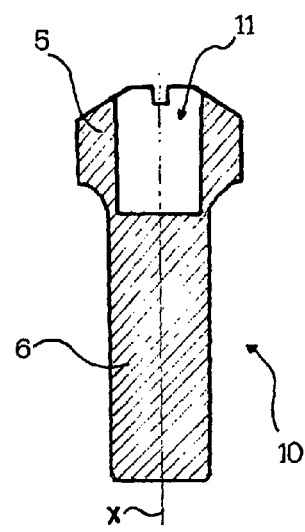
Figure 4C:
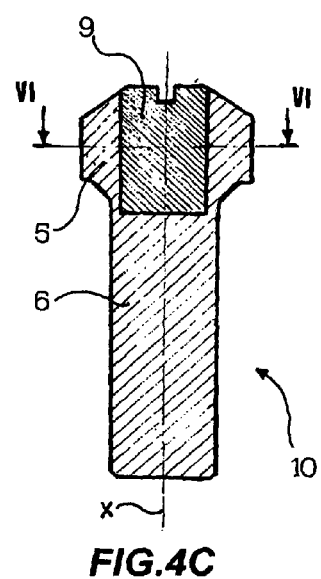
Figure 6:
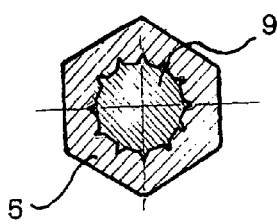
Figure 4D:
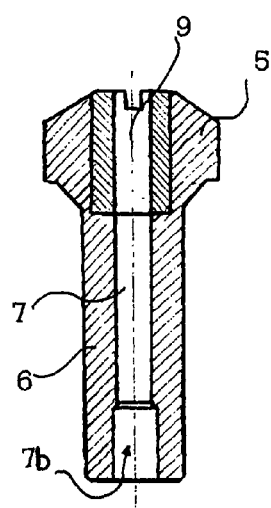
Figure 4E:
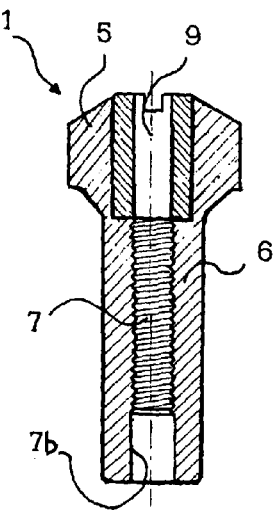

The seats for stop members 9b may be made jointly with blind hole 11, in particular through pressing, and in such a way that the stage of filling the same with plastics material in a fused state makes it possible to manufacture the aforesaid members 9b together with the insert, as illustrated in FIGS. 4B and 4C.

FIG. 5 describes a further variant embodiment of the nipple according to this invention.

The method for the manufacture of this embodiment provides for the making of a blind hole 11 with a diameter greater than the diameter of second hole 7 and at least two holes 11b located in the rim around the X axis at a distance from the latter which is less than the diameter of second hole 7, as illustrated in FIG. 5B.

Holes 11b may advantageously be of shallower depth than hole 11, in such a way that the former extend only along head 5 of the nipple while the latter may also extend along shank 6, thus favouring the possibility of using shorter spokes, with a corresponding saving of weight and cost.

Holes 11 and 11b provided in this way are filled with plastics material in the fused state in such a way as to form an insert 9 comprising a single body and provided with extensions 9b which engage holes 11b.

Again in this case therefore rotation of insert 9 will be prevented by extensions 9b, and hole 7 and the corresponding partial thread may be made more easily. In addition to this it will be possible to use an insert 9 which also extends along shank 6 without the risk of excessively weakening the structure of the nipple, the stability of the insert being ensured by extensions 9b and a minimum thickness of plastics material in hole 7 to achieve the self-locking effect.

The invention thus resolves the problem set in a simple, effective and inexpensive manner.

The invention claimed is:

1. A method for the manufacture of self-locking nipples comprising:
   providing a semi-finished product for a nipple having a predetermined axis (X), with a head that is enlarged with respect to a shank,
   providing a plurality of blind holes in the head running along the axis (X),
   injecting a fluid resin into the blind holes and solidifying the injected resin so as to obtain a corresponding insert nested therein,
   making a second axial hole in the semi-finished product at least partly intersecting the insert, the second axial hole being designed to receive a threaded extremity of a spoke,
   further comprising forming a thread in the second hole in a portion which is not in contact with the insert after the fluid resin is injected into the blind holes so as to form a threaded portion in the second hole,
   wherein the plurality of blind holes are positioned such that part of the cross-section of the blind holes subsequently intersects the second axial hole when the latter is made in the semi-finished product.

2. The method according to claim 1, wherein the insert comprises a stop member engaging in a corresponding seat in the blind holes.

3. The method according to claim 2, wherein the seat is formed by moulding together with the blind holes.

4. The method according to claim 1, wherein the plurality of blind holes, arranged in a ring around the axis (X) at a distance therefrom which is less than the diameter of the second axial hole, are provided in the semi-finished product.

5. The method according to claim 1, wherein the plurality of blind holes have a larger diameter than the diameter of the second axial hole and are coaxial therewith.

6. A method for the manufacture of self-locking nipples comprising:
   providing a semi-finished product for a nipple having a predetermined axis (X), with a head that is enlarged with respect to a shank,
   providing a plurality of blind holes in the head running along the axis (X), the plurality of blind holes comprising a first blind hole and further blind holes arranged in a ring around the axis (X) at a distance therefrom which is less than the diameter of the first blind hole, the further blind holes being of shallower depth than the first blind hole,
   injecting a fluid resin into the plurality of blind holes and solidifying the injected resin so as to obtain a corresponding insert nested therein,
   making a second axial hole in the semi-finished product at least partly intersecting the insert, the second axial hole being designed to receive a threaded extremity of a spoke,
   further comprising forming a thread in the second hole in a portion which is not in contact with the insert after the fluid resin is injected into the blind holes so as to form a threaded portion in the second hole;
   wherein the plurality of blind holes are positioned such that part of the cross-section of the blind holes subsequently intersects the second axial hole when the latter is made in the semi-finished product;
   wherein the insert comprises a stop member engaging in a corresponding seat in the blind holes; and
   wherein the seat is produced by the further blind holes.

* * * * *